(12) United States Patent
Wahl et al.

(10) Patent No.: US 11,428,146 B2
(45) Date of Patent: Aug. 30, 2022

(54) FIXING DEVICE FOR EXHAUST SYSTEM COMPONENT AND EXHAUST SYSTEM

(71) Applicant: Sumitomo Riko Company Limited, Aichi (JP)

(72) Inventors: Anna-Lena Wahl, Freiensteinau (DE); Alexander Noll, Steinau a. d. Str. (DE)

(73) Assignee: Sumitomo Riko Company Limited, Aichi (JP)

( * ) Notice: Subject to any disclaimer, the term of this patent is extended or adjusted under 35 U.S.C. 154(b) by 472 days.

(21) Appl. No.: 16/706,802

(22) Filed: Dec. 8, 2019

(65) Prior Publication Data

US 2020/0256239 A1    Aug. 13, 2020

(30) Foreign Application Priority Data

Feb. 11, 2019    (DE) .......................... 102019000970.3

(51) Int. Cl.
| | |
|---|---|
| *F01N 13/18* | (2010.01) |
| *B60K 13/04* | (2006.01) |
| *F16F 1/377* | (2006.01) |
| *F16F 1/371* | (2006.01) |

(52) U.S. Cl.
CPC .......... *F01N 13/1822* (2013.01); *B60K 13/04* (2013.01); *F16F 1/371* (2013.01); *F16F 1/377* (2013.01)

(58) Field of Classification Search
CPC ...... B60K 13/04; F01N 13/1822; F16F 1/371; F16F 1/377
USPC .......................................................... 60/322
See application file for complete search history.

(56) References Cited

U.S. PATENT DOCUMENTS

| | | | | |
|---|---|---|---|---|
| 4,893,778 | A * | 1/1990 | Drabing ................ | F16L 55/035 248/610 |
| 8,376,331 | B2 | 2/2013 | Rodecker | |
| 8,646,761 | B2 | 2/2014 | Rodecker | |
| 2001/0047897 | A1* | 12/2001 | Steenackers ........... | B60K 13/04 180/309 |
| 2004/0262460 | A1* | 12/2004 | Molnar ................ | F16F 1/3873 248/610 |
| 2005/0184201 | A1* | 8/2005 | Komitsu ................ | B60K 13/04 248/58 |

(Continued)

FOREIGN PATENT DOCUMENTS

| | | |
|---|---|---|
| DE | 10023781 | 12/2001 |
| DE | 102016211273 | 12/2017 |

(Continued)

*Primary Examiner* — Jorge L Leon, Jr.
(74) *Attorney, Agent, or Firm* — JCIPRNET

(57) ABSTRACT

The disclosure provides a fixing device for connecting an exhaust system component to a vehicle body, including: a carrier for attachment to the vehicle body; and an elastomer element connected to the carrier. The elastomer element has a connection recess into which a widened end portion of a holding element of the exhaust system component can be inserted, such that a connection region of the elastomer element defining the connection recess at least partially undercuts the widened end portion of the holding element in a joining direction. A fixing device comprises a stiffening structure stiffening the connection region of the elastomer element to impede an extraction of the widened end portion of the holding element.

14 Claims, 3 Drawing Sheets

(56) References Cited

U.S. PATENT DOCUMENTS

| | | | | |
|---|---|---|---|---|
| 2009/0001242 | A1* | 1/2009 | Endo | B60K 13/04 |
| | | | | 248/610 |
| 2009/0230601 | A1* | 9/2009 | Lenda | B60K 13/04 |
| | | | | 267/141.1 |
| 2017/0044966 | A1* | 2/2017 | Rodecker | F01N 13/1822 |
| 2018/0156102 | A1* | 6/2018 | Sun | F16L 3/16 |
| 2019/0101042 | A1* | 4/2019 | Kamiya | F16B 9/07 |

FOREIGN PATENT DOCUMENTS

| | | | | |
|---|---|---|---|---|
| EP | 509918 | A1 * | 10/1992 | B60K 13/04 |
| EP | 3260322 | A1 * | 12/2017 | B60K 13/04 |
| FR | 3086331 | A1 * | 3/2020 | B60K 13/04 |
| WO | WO-2018038302 | A1 * | 3/2018 | B60K 13/04 |

* cited by examiner

FIXING DEVICE FOR EXHAUST SYSTEM COMPONENT AND EXHAUST SYSTEM

CROSS REFERENCE TO RELATED APPLICATIONS

This application claims the priority benefit of German Patent Application No. 10 2019000970.3, filed on Feb. 11, 2019. The entirety of the above-mentioned patent application is hereby incorporated by reference herein and made a part of this specification.

BACKGROUND

Technical Field

The disclosure relates to a fixing device for connecting an exhaust system component to a vehicle body.

Description of Related Art

During operation of an internal combustion engine, exhaust gas is formed which has to be disposed of and discharged in a targeted manner via an exhaust system. The internal combustion engine additionally generates vibrations, which can be transmitted to the exhaust system and the further transmission of which to the vehicle body is undesirable. To avoid such a transmission of vibrations, it is known in particular to suspend the exhaust system from the vehicle body by means of elastic damping elements.

The known suspending or fixing devices for exhaust systems generally represent a secure attachment and, at the same time, a vibration decoupling for the general use of a vehicle and its normal operation. In certain situations, however, for instance when driving over an obstacle, a component of the exhaust system, such as a silencer or an underfloor catalytic converter, can contact the ground or the obstacle, as a result of which additional forces, e.g. tensile forces, can act on the component. This can lead to the disconnection or extraction of components of the exhaust system from their allocated damping elements or to the destruction of the damping elements. The forces act in particular in the longitudinal direction of the vehicle, and so the demands placed on the fixing device, in particular the elastic damping elements, are increased in this direction.

Thus, the disclosure provides a fixing device for connecting an exhaust system component to a vehicle body, which can withstand the loads or forces described above and which exhibits significantly increased security against extraction of the attached component.

SUMMARY

According to one embodiment, the disclosure provides a fixing device for connecting an exhaust system component to a vehicle body is provided, comprising a carrier for attachment to the vehicle body and an elastomer element connected to the carrier The elastomer element has a connection recess into which a widened end portion of a holding element of the exhaust system component can be inserted, so that a connection region of the elastomer element defining the connection recess at least partially undercuts the widened end portion of the holding element in a joining direction. The fixing device comprises a stiffening structure stiffening the connection region of the elastomer element to impede an extraction of the widened end portion of the holding element.

According to another embodiment, the disclosure provides an exhaust system for a motor vehicle, comprising an exhaust system component having a holding element, and a fixing device above. In addition, a widened end portion of the holding element is inserted in the connection recess of the elastomer element.

DESCRIPTION OF THE EMBODIMENTS

Figure 1:
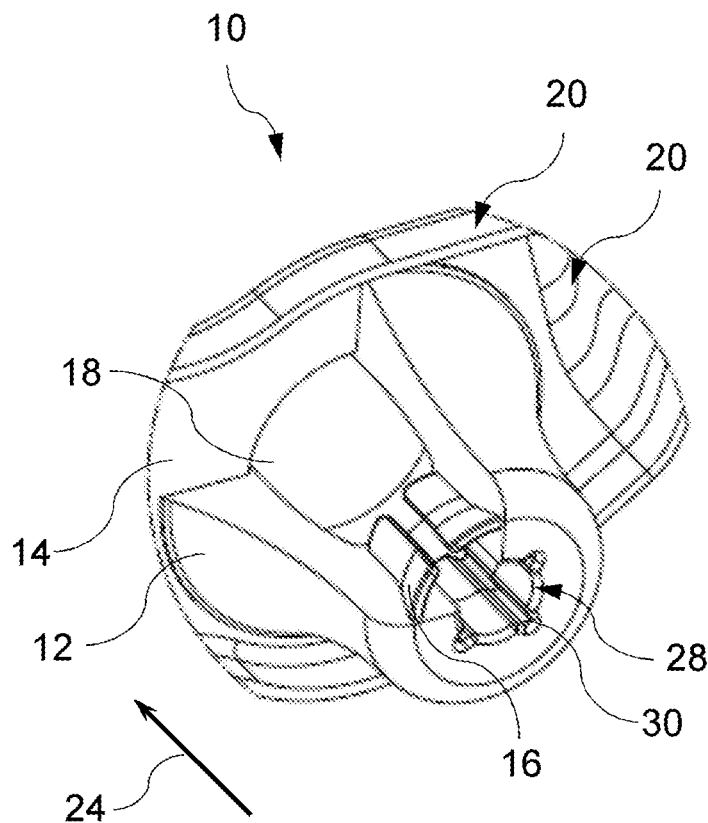
FIG. 1 is a perspective view of a section of the fixing device, wherein part of the elastomer element is hidden.

FIG. 1 shows a perspective view of an embodiment of the fixing device 10. The fixing device 10 has an elastomer element 12, which is molded on to a carrier 14 by means of an injection-molding method. The elastomer element 12 is made of an elastomer in the present case. In the elastomer element 12 a stiffening structure 16 is embedded, by means of an in-mold process in the present case. The stiffening structure 16 is made of a thermoplastic. The elastomer element 12 has a connection recess 28, which is formed for the insertion of a holding element 38 (see FIG. 4). In the region of the connection recess 28, the elastomer element 12 furthermore has, in the present case, four grooves 30 or notches. Each groove 30 offers additional space for an elastic deformation of the elastomer element 12 during the insertion of the holding element 38.

The carrier 14 is made of a steel sheet in the present case, and has multiple curved regions 20 next to a recess 18 in the region of the elastomer element 12. The recess 18 on the one hand permits a lighter construction of the carrier 14, and on the other hand, ease of production is ensured by means of the recess 18. The curved regions 20 on the one hand serve to stiffen the carrier 14, and on the other hand a section of the carrier 14 on which the elastomer elements 12 are arranged, in particular a central section of the carrier 14, can be spaced apart from the vehicle body by means of the curved regions 20.

Figure 2:
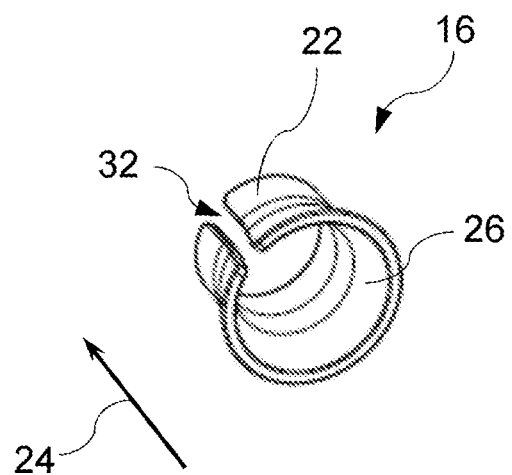
FIG. 2 is a perspective view of a stiffening structure prior to connecting to an allocated elastomer element.

FIG. 2 shows in detail the stiffening structure 16 from FIG. 1. The stiffening structure 16 in the present case is configured as a stiffening sleeve and has a substantially annular portion 22 and a widening portion 26 widening in the joining direction 24 to the rear. The widening portion 26 is conical in the present case and facilitates an initial insertion of a widened end portion 40 (see FIG. 4) of an allocated holding element 38. The stiffening structure 16 in the present case has a longitudinal slot 32 which extends in the joining direction 24 over the entire length of the stiffening structure 16, i.e. is open at both ends of the stiffening structure. Because of the longitudinal slot 32 the stiffening structure 16 acquires an increased measure of radial flexibility, as a result of which the insertion of the holding element 38 can take place with a lower application of force, and an undercut with respect to the widened end portion 40 can also be produced in the inserted state.

Figure 3:
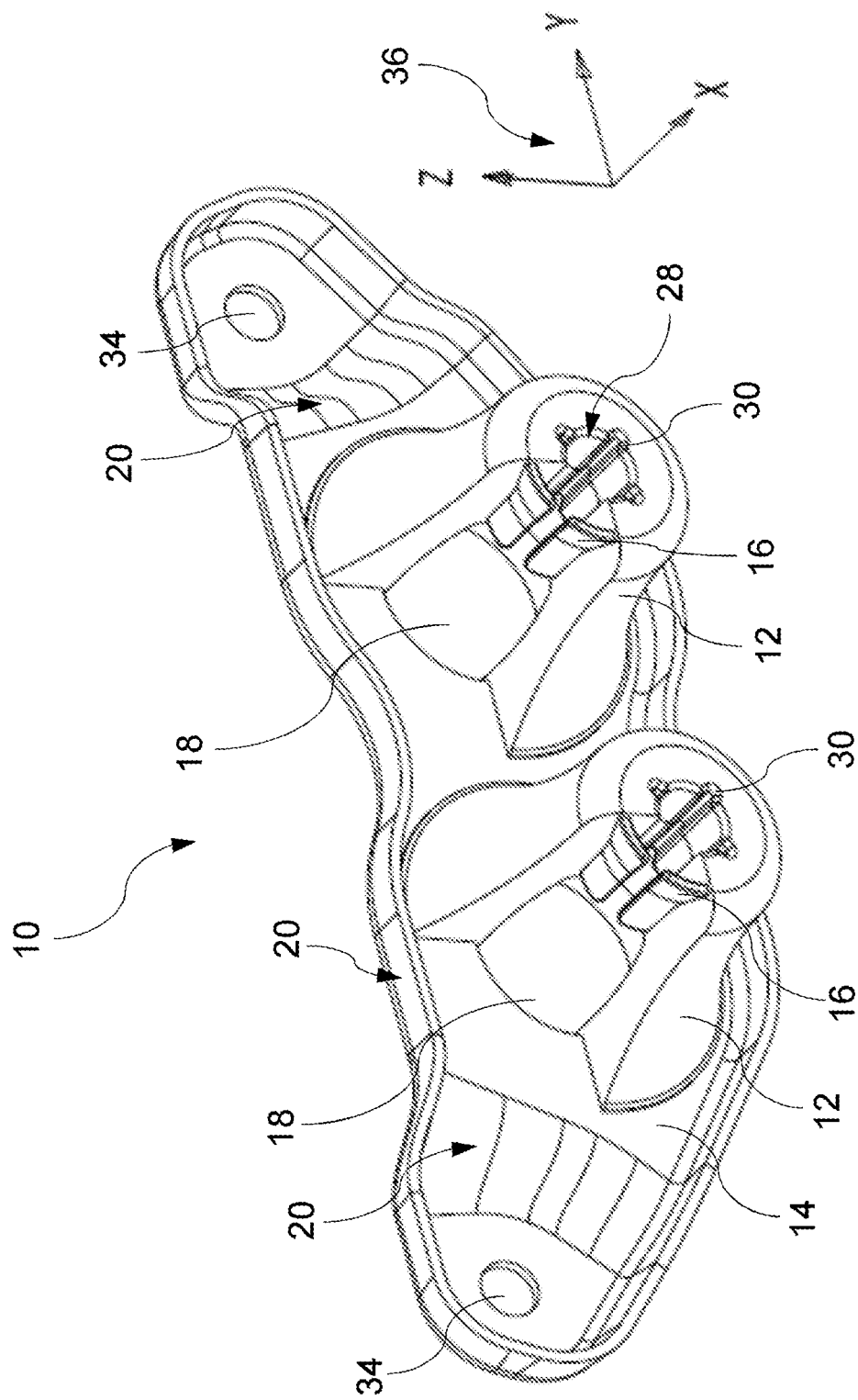
FIG. 3 shows the fixing device with two elastomer elements and stiffening structures vulcanized therein, wherein part of the elastomer element is hidden in each case.

FIG. 3 shows the embodiment of the fixing device 10 according to FIG. 1. In the present case, two elastomer elements 12 are connected to the carrier 14, so that the fixing device 10 illustrated here is formed for supporting an exhaust system component having two holding elements 38. In principle, however, a different number of elastomer elements 12 can also be mounted on the carrier. The carrier 14 has two fixing recesses 34, which are each formed to accommodate a bolt, so that the carrier can be bolted to a motor vehicle body. Alternatively, the carrier 14 can be bolted on the vehicle body by means of one or more stud bolts, which are provided on the motor vehicle body, and a corresponding number of nuts.

Furthermore, FIG. 3 shows an X-Y-Z coordinate system 36. The X-axis here corresponds to the vehicle's longitudinal direction, and in the present case also the joining/extraction direction 24. The Y-axis corresponds to the vehicle's width direction, and the Z-axis corresponds to the vehicle's height direction.

Figure 4:
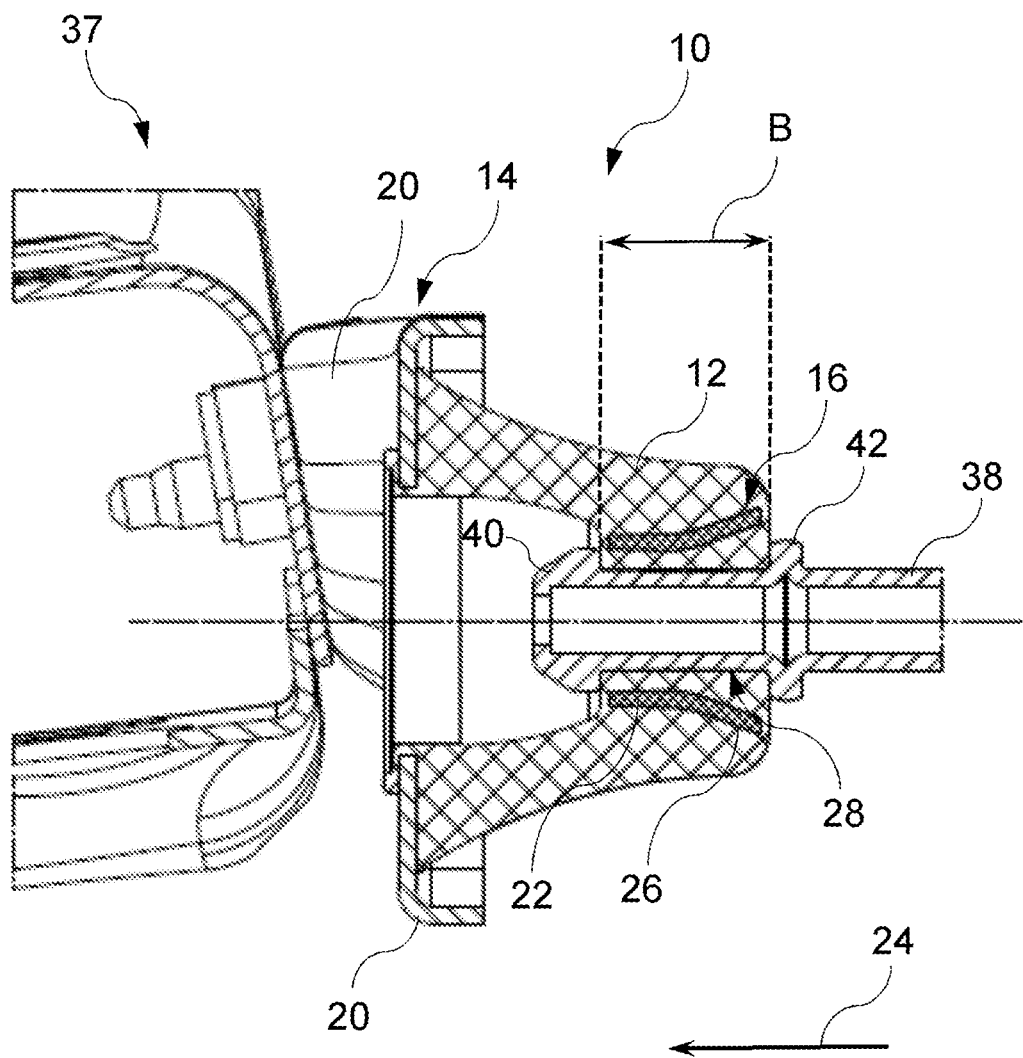
FIG. 4 is a sectional view of a fixing device attached to a vehicle body.

FIG. 4 shows a sectional view along the X-Z plane of a state of the fixing device 10 mounted on a vehicle body. The carrier 14 in the present case is connected to the vehicle body 37 of a motor vehicle. The connection is made by means of a nut-and-bolt connection. In the connection recess 28 the holding element 38 of an exhaust system component (not shown) to be supported by means of the fixing device 10 is inserted. The holding element 38 is in the form of a hollow tube in the present case and has a widened end portion 40. The widened end portion 40 resembles an outspread mushroom cap with conically extending side surfaces. The end portion 40 is undercut by the elastomer element 12 such that an additional force is needed for extracting or decoupling the holding element 38 from the elastomer element 12. In addition, a free elastic expansion of the elastomer element 12 in the connection region B is stiffened by the stiffening structure 16.

The holding element 38 furthermore exhibits an intermediate widening 42. The intermediate widening 42 abuts against the elastomer element 12 on the exhaust system component side and prevents a further insertion of the holding element 38 in the joining direction 24. Consequently, the exhaust system component is mounted on the vehicle body 37 securely but nevertheless elastically and with vibration damping in both the joining and extraction direction 24 (−X and +X direction respectively) by means of the fixing device 10. The exhaust system component can be an underfloor catalytic converter.

Other Configurations

According to one embodiment, the disclosure provides a fixing device for connecting an exhaust system component to a vehicle body is provided, comprising a carrier for attachment to the vehicle body and an elastomer element connected to the carrier The elastomer element has a connection recess into which a widened end portion of a holding element of the exhaust system component can be inserted, so that a connection region of the elastomer element defining the connection recess at least partially undercuts the widened end portion of the holding element in a joining direction. The fixing device comprises a stiffening structure stiffening the connection region of the elastomer element to impede an extraction of the widened end portion of the holding element.

Advantageously, the configuration described above increases security against an extraction of the holding element of the exhaust gas system component significantly. In particular, the stiffening structure can prevent or impede the connection region of the elastomer element from being deformed under load by the holding element such that the undercut of the elastomer element against the widened end portion of the holding element is overcome and the holding element is extracted or moved out of the connection recess. In other words, the stiffening structure can prevent or impede an elastic mushrooming of the elastomer element if the holding element is subject to a load against the joining direction.

The fixing device is formed such that an exhaust system component can be connected to the vehicle body by means of the vibration-damping elastomer element. An exhaust system component here can be understood to mean in principle components of an exhaust system, such as a catalytic converter, in particular an underfloor catalytic converter, a particle filter, an SCR catalytic converter, a front silencer, a middle silencer and/or a rear silencer, as well as a manifold, a Y-pipe, a tailpipe and other connecting pipe sections. Other components of an exhaust system that are not mentioned here can also be included under the term "exhaust gas system component" within the framework of this application.

The term "vehicle body" can also mean e.g. an element of the vehicle body, such as the front axle subframe or the subframe of the vehicle. The term "connect" can mean, within the framework of this application, a permanent, a detachable or a limitedly detachable joining together of the individual elements of the fixing device and/or the vehicle body. So-called amorphous substances, such as adhesive, liquid solder or welding or weld filler materials, can also be used here.

For connecting to the fixing device, the exhaust system component can comprise one, two or more holding elements that can be connected to the fixing device. Accordingly, the fixing device can have one, two or more elastomer elements. One or more elastomer elements each having multiple connection recesses are also possible to be provided. The holding element can be formed in an elongated shape, for instance as a cylindrical hollow tube. In principle, however, tubes or pins made of solid material can also be considered. The shape of the holding element, viewed in cross-section, can be round or rectangular, elliptical or another suitable shape. The holding element can be formed with two ends, one end being connected to the exhaust system component. The holding element can have the widened end portion at its other end. The widened end portion of the holding element can also be referred to as "terminal widening". The widened end portion can, for instance, resemble the shape of a truncated cone or can approximately resemble the shape of a mushroom cap, comprising a broad region that tapers towards a narrow region. The broad region of the widened end portion can face the exhaust system component, whereas the narrower region of the widened end portion can be terminal, facing away from the exhaust system component. As a result, introduction or insertion of the holding element can be facilitated and removal or extraction of the holding element can be impeded. Between the two ends of the holding element, i.e. between the terminal widening and the end connected to the exhaust system component, the holding element can exhibit a further, intermediate widening. The distance between the terminal widening and the intermediate widening can correspond to a wall thickness of the elastomer element of the fixing device in the connection region, so that after an insertion of the holding element into the elastomer element, the elastomer element is arranged in an exact fit between the widened end portion and the intermediate widening. The widened end portion and the intermediate widening can have a diameter that is greater than the diameter of the connection recess in a non-deformed state. The diameters of the widened end portion and of the intermediate widening can be the same as each other or different.

The components of the fixing device comprise in particular the carrier, at least one elastomer element connected to the carrier, and a stiffening structure, which stiffens the connection region, wherein the connection recess formed therein can also be stiffened.

The carrier is formed to be attachable or connectable to the vehicle body. For attachment purposes, the carrier can for example be welded, soldered, riveted or bolted to the front axle subframe, or fixed or mounted thereon by means of other detachable or non-detachable joining methods.

The carrier can be formed as a substantially flat component, but can also have spatial expansions at least in sections. The carrier can also be in the form of a three-dimensional structural component. In other words, the carrier can have any suitable geometric shape. In particular, the carrier can have a curved and/or bent region surrounding it. The carrier can furthermore have one or more corrugations or other stiffening structures. The carrier can have at least one hole and/or at least one recess and/or at least one slot for attaching the carrier to the vehicle body.

The carrier can be formed by shaping a metal sheet. However, any suitable material, such as metal or plastic, can be considered as a material for the carrier. In principle, the use of a composite material is also possible. The carrier can also be formed as a combination of different materials, in principle.

One, two or more elastomer elements can also be connected to the carrier. The carrier can have a recess in the region in which the elastomer element is arranged. The elastomer element can be molded or vulcanized on to the carrier. Furthermore, the elastomer element can penetrate the carrier at least in some regions. The carrier can be overmolded or surrounded by the elastomer element. In other words, the carrier can be at least partially embedded in the elastomer element. Possible technical methods of producing the connection between carrier and elastomer element can be, in particular, injection molding and vulcanization. The connection between carrier and elastomer element can be non-detachable. However, detachable or limitedly detachable alternatives can also be used, so that in the event of damage, the elastomer element can be replaced. In the case of a detachable connection, the elastomer element can be connected to the carrier in a positive and/or non-positive manner. The elastomer element is made of an elastic material, in particular an elastomer material, wherein any material, in particular a material with vibration-damping properties, can be used in principle.

The elastomer element can be formed for instance in a substantially bell-like, cup-like, pot-like or hemispherical shell-like shape, viewed in cross-section.

The elastomer element has a connection recess, the connection recess being defined by a connection region. The connection region can be a base region or end portion of the elastomer element of the shape described above. The connection recess is formed to allow insertion of an allocated holding element of the exhaust system component. The connection recess can have a cross-sectional shape that substantially corresponds to the cross-sectional shape of the holding element. The connection recess can extend through the elastomer element, i.e. the connection recess can be open on both sides, or else can be a blind hole, i.e. closed on one side. The term "insertion" can in particular be understood to mean an introducing of the holding element into the elastomer element, overcoming an elastic deformation of the elastomer element, in particular of the connection region. In particular here, the widened end portion of the holding element can be passed through the connection recess in a joining direction, overcoming an elastic deformation of the elastomer element, until the widened end portion of the holding element has penetrated the connection region completely and the elastomer element or the connection region has substantially regained its original shape. In the inserted state the elastomer element or connection region undercuts the widened end portion of the holding element in the joining direction. The term "insertion" can mean that a connection is formable by end portions, at least one of these end portions having a local thickening, namely the widened end portion of the holding element.

If the widened end portion is inserted in the elastomer element, the broad region of the widened end portion of the holding element, which is approximately in the shape of a truncated cone, can be at least partially undercut by the connection region of the elastomer element. This results in an increase in force needed to extract the holding element, since in addition to the force that would have to be applied to overcome the frictional force between elastomer element and holding element, the force needed to elastically deform the elastomer element and overcome the positive fit between the widened end portion and the elastomer element would also have to be added.

The connection region can be formed such that a wall thickness of the connection region substantially corresponds to the distance between the widened end portion and the intermediate widening of the holding element. Consequently, an abutting of the intermediate widening during insertion of the holding element can be interpreted as a signal of a complete insertion of the widened end portion of the holding element. In addition, the intermediate widening can impede a further pushing in of the holding element through the connection region, so that the holding element can be attached to the fixing device securely and with an accurate fit.

The joining direction can be the direction in which the holding element or the widened end portion is introduced or pushed into the elastomer element during mounting of the exhaust system component on the fixing device. The joining direction can correspond to an axial direction of the elastomer element or of the connection recess. In the mounted state of the fixing device on the vehicle body the joining direction can correspond to the vehicle's longitudinal direction. The joining direction can also be referred to as the first direction or minus-X direction. The vehicle's longitudinal direction can also be referred to as the X direction. The term "insertion" can be understood as a pushing in or introducing, in particular of the widened end portion into the connection region or through the connection recess. "Insertion" can also be understood to mean "press-fitting" or "coupling" or "producing a coupling".

To increase the stiffness of the elastomer element, the fixing device has a stiffening structure. As a result, an unintentional extraction of the widened end portion of the allocated holding element out of the fixing device by forces acting in the extraction direction or the vehicle's longitudinal direction is significantly impeded.

The stiffening structure can be formed in an annular, hollow cylindrical or substantially truncated conical shape. A combination of annular shape, hollow cylindrical shape and hollow truncated cone shape can likewise be used, as can a substantially double truncated cone-shaped stiffening structure. The stiffening structure can be in one or more parts. The stiffening structure can have one or more slots, which are configured in the joining direction, as a result of which the stiffening structure can have elasticity in the radial direction, i.e. orthogonally to the joining direction. This can make it easier for the holding element to be inserted into the elastomer element. Alternatively, the stiffening structure can also be closed all the way around.

An annular shape or hollow cylindrical shape of the stiffening structure that is closed all the way around can have the advantage of ease of production, since it can easily be produced from tube material. A double truncated cone shape of the stiffening structure, i.e. with a widened central part and two tapered end portions, can have the advantage that a particularly good stiffening of the elastomer element can be ensured both at the widened end portion of the holding element and at the intermediate widening of the holding element.

The smallest inner diameter of the stiffening structure can be larger than the outer diameter of the widened end portion of the holding element. If the stiffening structure has one or more slots, the smallest inner diameter of the stiffening structure can also be smaller than the outer diameter of the widened end portion.

The stiffening structure can taper in the joining direction of the holding element, so that after the insertion of the holding element, the widened end portion is undercut by the stiffening structure in the joining direction. Within the framework of this application the term "undercutting" can also mean engaging behind, hooking behind or a positive connection in general. In the case of the undercutting described, two stiff components that undercut one another, namely the widened end portion and the stiffening structure, are located one behind the other in the extraction direction of the holding element, as a result of which the force needed for extraction, i.e. for demounting the holding element, is significantly increased. The extraction direction corresponds to a direction opposite to the joining direction. The extraction direction can extend in the plus-X direction.

The stiffening structure can increase the force needed for insertion and/or extraction, since the elastomer element is less able to spring back or mushroom.

The stiffening structure can be overmolded by the elastomer element or can be vulcanized therein. The stiffening structure can also be arranged on the elastomer element or vulcanized thereon from the outside. Furthermore, the region of the elastomer element adjacent to the connection recess can be provided with one, two or more grooves or approximately V- or U-shaped depressions, which extend, in particular, along the joining direction. As a result, additional space can be provided for elastic deformation of the elastomer element, which can be advantageous, in particular, in the case of a stiffening structure that is closed all the way around.

The stiffening structure can consist of a plastic, for instance a thermoset or thermoplastic material. Alternatively, the stiffening structure can consist of another suitable stiff material, such as e.g. metal.

The fixing device can, in particular, be connected to the exhaust system component before being mounted on a vehicle body. Advantageously, therefore, to attach the exhaust system component to a motor vehicle body, it can suffice to then connect only the fixing device to the vehicle body. To attach a complete exhaust system it can suffice to connect each of the fixing devices associated with the individual exhaust system components to the vehicle body.

The stiffening structure can be at least partially embedded in the elastomer element.

Advantageously, this configuration can ensure ease of production and particularly good stiffening of the connection region. The stiffening structure can be embedded in the elastomer element by means of injection molding, for instance by means of an in-mold process.

The stiffening structure can be arranged at least partially surrounding the connection recess in the connection region of the elastomer element.

Since the stiffening structure can increase the stiffness of the surrounded section of the elastomer element, a precisely defined section of the connection recess can advantageously be formed such that it is stiffer than another, although the elastomer element in its entirety can be made of the same material. As a result, the elastomer element can, by simple means, exhibit a precisely definable resistance to extraction.

The stiffening structure can be formed such that it is at least partially adjacent to the connection recess.

The stiffening structure can at least partially form the boundary region of the connection recess, as a result of which the stiffness or resistance to deformation of the elastomer element can be greater in this section than in a section in which the stiffening structure is not directly adjacent to the connection recess. Furthermore, the stiffening structure can be arranged close to the connection recess on an edge of the connection recess arranged at the front in the joining direction such that the holding element can be undercut by the stiffening structure in the inserted state. A region arranged at the front in the joining direction or the front edge of the connection recess can also be formed at least partially by the stiffening structure itself and not for instance by the elastomer element. In other words, the stiffening structure can be formed to at least partially undercut the widened end portion of the holding element in an inserted state.

The stiffening structure can be a stiffening sleeve, which is arranged around the connection recess. The stiffening sleeve can have a longitudinal slot, which is open at least at a front end of the stiffening sleeve in the joining direction.

The longitudinal slot can extend continuously along the stiffening structure or stiffening sleeve in the joining direction or can be open only at a front end of the stiffening structure in the joining direction. In the region of the longitudinal slot the stiffening structure can have lower stiffness, in particular lower radial stiffness. The stiffening structure can in other words have greater flexibility in the region of the longitudinal slot. The stiffening structure can also have two, three, four or more longitudinal slots, so that finger-like structures are formed on the stiffening structure. During insertion or mounting of a holding element in the joining direction, these finger-like structures can spring back outwardly in the radial direction and finally engage behind the widened end portion of the holding element. The stiffening sleeve can furthermore be formed from an annular and a conically extending or tapering section.

The stiffening structure can have a widening portion widening in the joining direction to the rear.

The stiffening structure can in other words have a conical section that widens to the rear in the joining direction, as a result of which the initial insertion of the widened end portion of the allocated holding element can be facilitated and a high stiffness can be ensured at the front in the joining direction.

The elastomer element can have at least one groove on the connection recess, which extends in the joining direction along the connection recess.

The term groove can in principle also mean a notch, gap, slot or recess, in particular in a wedge shape. By means of the groove an additional space can be provided for elastic deformation of the elastomer element during insertion.

The stiffening structure can be integrally formed.

The elastomer element can be injection molded on and/or around the stiffening structure.

The elastomer element can be vulcanized in or on the stiffening structure. In vulcanizing in or on the stiffening structure, this is connected to the elastomer element from outside and/or from inside by means of vulcanization after the shaping of the elastomer element.

According to another embodiment, the disclosure provides an exhaust system for a motor vehicle, comprising an exhaust system component having a holding element, and a fixing device, wherein a widened end portion of the holding element is inserted in the connection recess of the elastomer element.

The insertion of the holding element can advantageously already be performed by the manufacturer of the exhaust system component, so that the entire exhaust system or only the exhaust system component, for example a catalytic converter, can be supplied to a motor vehicle manufacturer with a fixing device already inserted. There, the fixing device can then be directly connected to the vehicle body.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fixing device for connecting an exhaust system component to a vehicle body, the fixing device comprising:
   a carrier configured to connect to the vehicle body;
   an elastomer element connected to the carrier, the elastomer element including a connection region defining a connection recess configured to receive a holding element of the exhaust system component, the connection region configured to at least partially undercut a widened end portion of the holding element; and
   a stiffening sleeve arranged at the connection region, the stiffening sleeve configured to impede an extraction of the widened end portion,
   wherein the stiffening sleeve includes a longitudinal slot that is opened at a front end corresponding to the widened end portion.

2. The fixing device according to claim 1, wherein the stiffening sleeve is at least partially embedded in the elastomer element.

3. The fixing device according to claim 2, wherein the stiffening sleeve surrounds the connection recess at least in sections.

4. The fixing device according to claim 1, wherein the stiffening sleeve further includes a widening portion which widens towards a rear end corresponding to the connection recess.

5. The fixing device according to claim 1, wherein the elastomer element further includes at least one groove extending axially along the connection recess.

6. The fixing device according to claim 1, wherein the stiffening sleeve is integrally formed with the elastomer element.

7. The fixing device according to claim 1, wherein the elastomer element is injection molded on and/or around the stiffening sleeve.

8. An exhaust system for a motor vehicle, the exhaust system comprising:
   an exhaust system component including a holding element; and
   a fixing device configured to connect the exhaust system component to a vehicle body of the motor vehicle, the fixing device comprising:
      a carrier configured to connect to the vehicle body;
      an elastomer element connected to the carrier, the elastomer element including a connection region defining a connection recess configured to receive the holding element, the connection region configured to at least partially undercut a widened end portion of the holding element; and
      a stiffening sleeve arranged at the connection region, the stiffening sleeve configured to impede an extraction of the widened end portion,
   wherein the stiffening sleeve includes a longitudinal slot that is opened at a front end corresponding to the widened end portion.

9. The exhaust system for a motor vehicle according to claim 8, wherein the stiffening sleeve is at least partially embedded in the elastomer element.

10. The exhaust system for a motor vehicle according to claim 9, wherein the stiffening sleeve surrounds the connection recess at least in sections.

11. The exhaust system for a motor vehicle according to claim 8, wherein the stiffening sleeve further includes a widening portion which widens towards a rear end corresponding to the connection recess.

12. The exhaust system for a motor vehicle according to claim 8, wherein the elastomer element further includes at least one groove extending axially along the connection recess.

13. The exhaust system for a motor vehicle according to claim 8, wherein the stiffening sleeve is integrally formed with the elastomer element.

14. The exhaust system for a motor vehicle according to claim 8, wherein the elastomer element is injection molded on and/or around the stiffening sleeve.

* * * * *